United States Patent [19]

Baba et al.

[11] Patent Number: 5,079,681
[45] Date of Patent: Jan. 7, 1992

[54] ILLUMINATING APPARATUS

[75] Inventors: Masaharu Baba; Yasuhiro Nieda; Akihiko Komatsuzaki, all of Yokohama; Takao Mizukami, Yokosuka, all of Japan

[73] Assignee: Toshiba Lighting and Technology Corporation, Tokyo, Japan

[21] Appl. No.: 498,092

[22] Filed: Mar. 20, 1990

[30] Foreign Application Priority Data

Mar. 22, 1989 [JP] Japan ............................... 1-067493

[51] Int. Cl.⁵ ............................. F21S 3/00; H01J 1/02
[52] U.S. Cl. ................................... 362/263; 362/223; 362/260; 362/216; 362/256; 313/15; 315/115
[58] Field of Search ............... 362/216, 217, 221, 223, 362/307, 311, 260, 261, 262, 263, 265, 222, 255, 256, 92; 313/15, 44; 315/114, 115

[56] References Cited

U.S. PATENT DOCUMENTS

| | | | |
|---|---|---|---|
| 2,581,959 | 1/1952 | Koehler | 313/15 |
| 3,779,640 | 12/1973 | Kidd | 313/15 |
| 3,942,062 | 3/1976 | Hernqvist | 313/15 |
| 4,432,044 | 2/1984 | Lautzenheiser | 362/223 |
| 4,488,208 | 12/1984 | Miller | 362/216 |
| 4,916,580 | 4/1990 | Sano et al. | 362/216 |
| 4,931,685 | 6/1990 | Dobashi et al. | 313/15 |

FOREIGN PATENT DOCUMENTS 63120066 9/1981 Japan.
63-47789 2/1988 Japan.

*Primary Examiner*—Ira S. Lazarus
*Assistant Examiner*—D. M. Cox
*Attorney, Agent, or Firm*—Cushman, Darby & Cushman

[57] ABSTRACT

An illuminating apparatus including a casing having an open side, a light reflective surface formed on the interior of the casing, a light diffusive transmission member on the casing and covering the open side, a discharge lamp mounted in the casing underneath the light diffusive transmission member, a first heating element disposed between the discharge lamp and the light reflective surface and a second heating element disposed between the discharge lamp and the light diffusive transmission member.

17 Claims, 3 Drawing Sheets

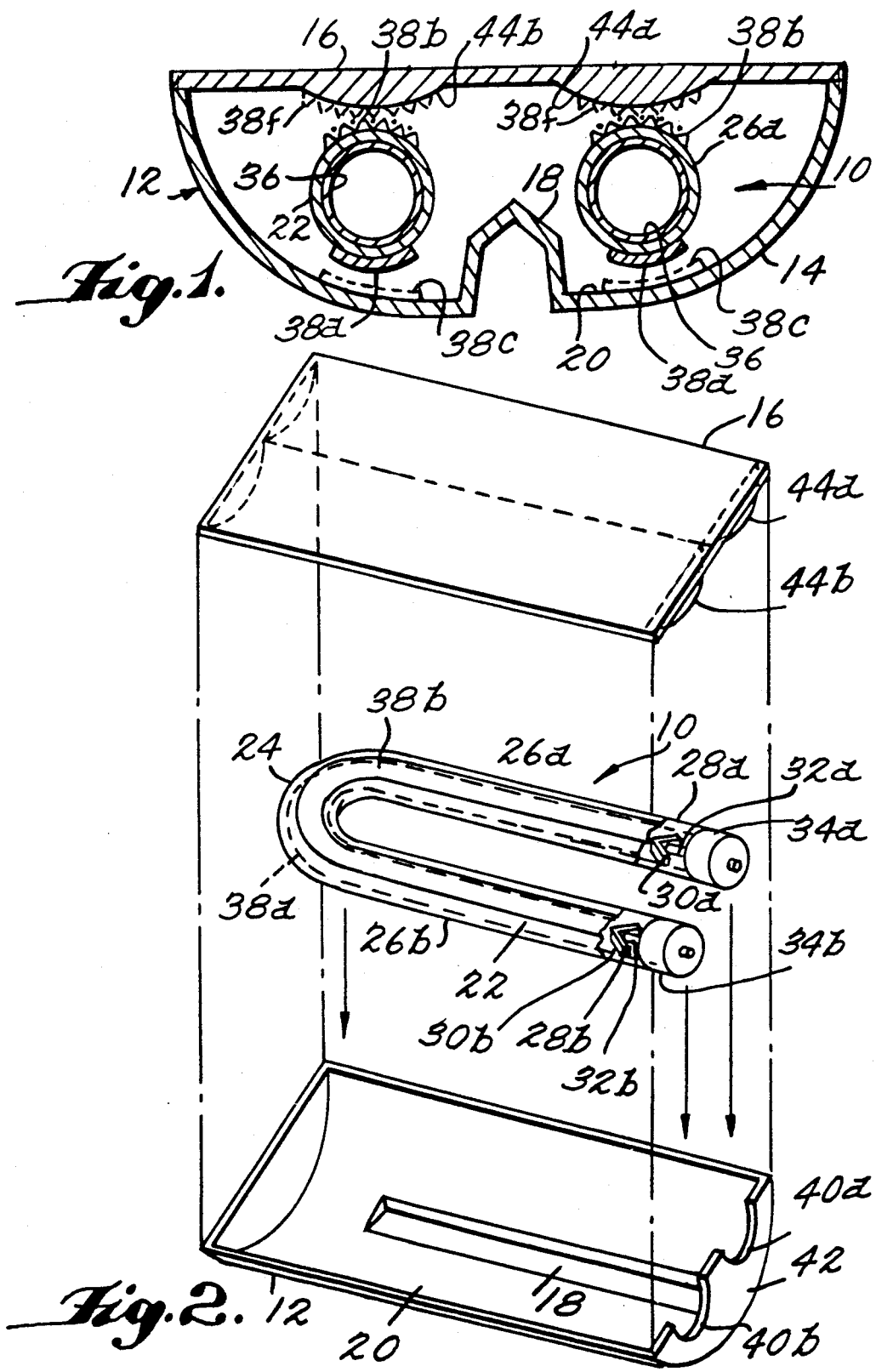

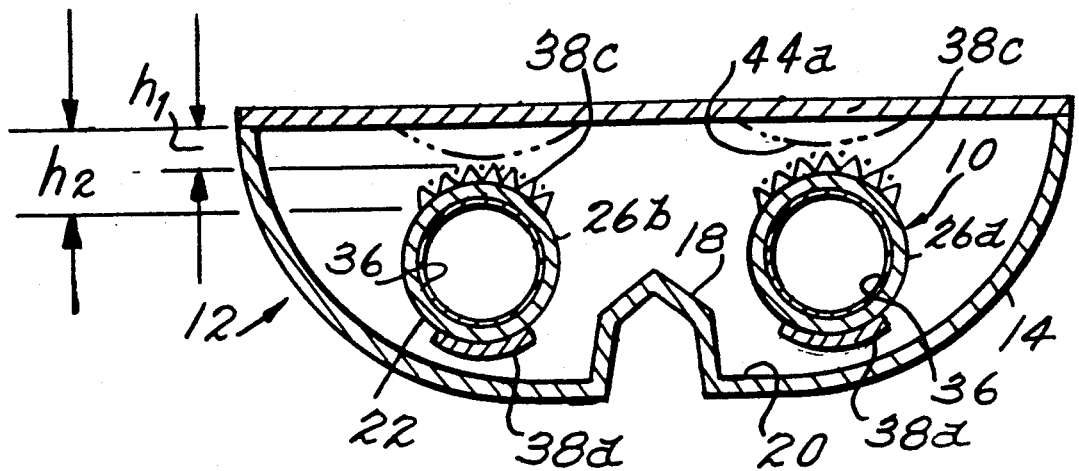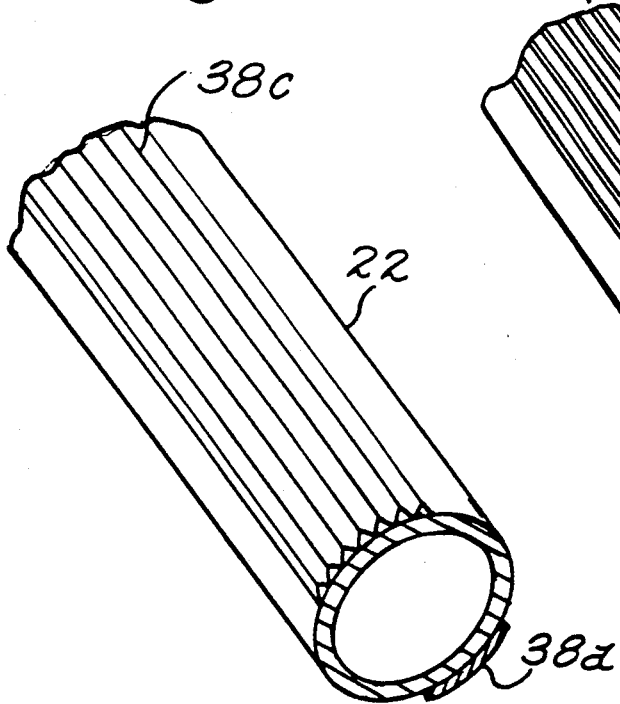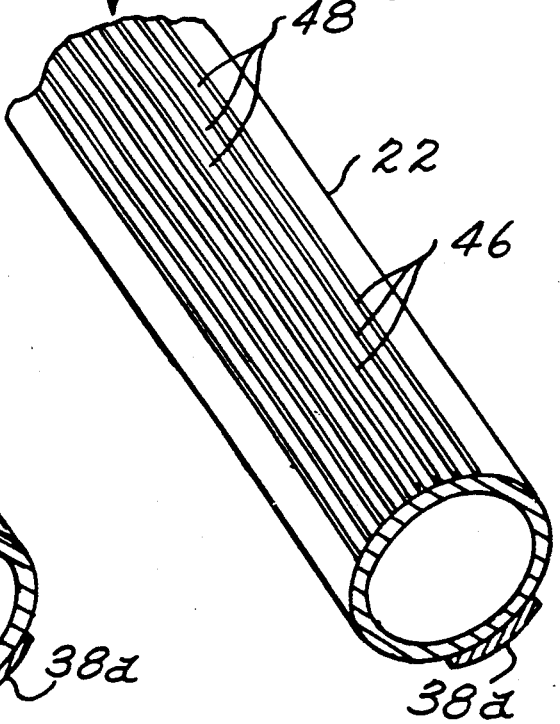

ILLUMINATING APPARATUS

FIELD OF THE INVENTION

The present invention relates to an illuminating apparatus, and more particularly, to a low pressure mercury vapor discharge lamp illuminating apparatus.

BACKGROUND OF THE INVENTION

Recently, a liquid crystal display device is used in many fields. For example, a digital meter using such a liquid crystal display device is provided on an instrument panel of automobiles. The liquid crystal display device is generally provided most of its illumination by an illuminating apparatus. Such an illuminating apparatus is referred to as a back-illuminating apparatus. The back-illuminating apparatus must illuminate uniformly the overall surface of the liquid crystal display device.

The back-illuminating apparatus is typically constructed using a low pressure mercury vapor discharge lamp such as a fluorescent lamp and a casing for housing the low pressure mercury vapor discharge lamp. The casing has a light diffusion plate on one side and a reflector on the other side. The illuminating apparatus is applied to the liquid crystal display device so that the light diffusion plate faces toward the liquid crystal display device. Thus, the light diffusive transmission plate diffusively transmits both the light directly radiated from the low pressure mercury vapor discharge lamp and the light reflected from the reflector. The diffused light from the light diffusion plate is uniformly applied to the overall surface of the liquid crystal display device.

The low pressure mercury vapor discharge lamp has a higher illuminating efficiency, less heat generation and a longer life in comparison to incandescent bulbs. Moreover, the low pressure mercury vapor discharge lamp has a relatively large light-emitting area due to its long discharge path. Also, the shape of the discharge path of the low pressure mercury vapor discharge lamp may be freely formed, for instance, into a U-letter shape, a W-letter shape, etc. Thus, the illuminating apparatus using the low pressure mercury vapor discharge lamp is advantageously able to perform a uniform illumination for the liquid crystal display device.

However, the low pressure mercury vapor discharge lamp takes a relatively long time to reach a rated brightness. It especially takes a long time in a low ambient temperature. This is because the mercury sealed in the low pressure mercury vapor discharge lamp does not vaporize as well in low ambient temperatures. Furthermore, the light diffusion plate and the reflector severely absorb the heat of the discharge lamp when they are close to each other for reducing the size of the illuminating apparatus.

For example, automobiles are required to operate in an ambient temperature range from approximately +40° C. to approximately −30° C. Therefore, the low pressure mercury vapor discharge lamp is required to start rapidly and to operate in such a low ambient temperature, e.g., −30° C.

Conventionally, a heater is provided on the low pressure mercury vapor discharge lamp for quickening the start of the operation. Such a heater is attached to the low pressure mercury vapor discharge lamp at a side where the heater does not face to the light diffusion plate. Generally, such a heater is placed on the side where the heater faces the reflector. As a result, the heater accelerates the evaporation of the mercury in the low pressure mercury vapor discharge lamp without disturbing the illumination for the liquid crystal display device.

In a conventional illuminating apparatus, a laminate heater is attached on the low pressure mercury vapor discharge lamp by a tubular fixing member such as a thermo-shrinkage tube. The thermo-shrinkage tube keeps the low pressure mercury vapor discharge lamp warm. However, when the low pressure mercury vapor discharge lamp is formed into a complicated shape, such as a U-letter shape, a W-letter shape, etc., it is difficult to make the shape of the laminate heater conform to the shape of the low pressure mercury vapor discharge lamp. It is also difficult to fit the thermo-shrinkage tube on the low pressure mercury vapor discharge lamp for fixing the laminate heater.

In another conventional illuminating apparatus, a print circuit type heater is coated on the low pressure mercury vapor discharge lamp. This type heater is formed by a resistive material such as a silver (Ag) paste. An illuminating apparatus of this type is disclosed in Japanese Patent Disclosure Tokkai-Sho 56-120066.

In the latter conventional illuminating apparatus, the printed heater can be easily conformed to the shape of the low pressure mercury vapor discharge lamp, even if the low pressure mercury vapor discharge lamp is formed in a complicated shape.

However, the surface of the low pressure mercury vapor discharge lamp not coated with the printed heater is exposed, so that low pressure mercury vapor discharge lamps of this type are difficult to keep warm. When gaps between the low pressure mercury vapor discharge lamp and the light diffusion plate and the reflector are decreased to allow thinning of the size of the illuminating apparatus, the sides of the low pressure mercury vapor discharge lamp facing the light diffusion plate and the reflector are undesirably cooled. Thus, this latter type of conventional illuminating apparatus is also not able to operate quickly at low ambient temperatures.

In addition, the prior art illumination devices suffer from a flaw in that the light they emit is often not properly diffused. This often results in bright and dark portions, or shadows, when even illumination is required.

SUMMARY OF THE INVENTION

It is, therefore, an object of the present invention to provide an illuminating apparatus which is able to start quickly at a relatively low ambient temperature.

Another object of the present invention is to provide an illuminating apparatus in which a heater provided on a low pressure mercury vapor discharge lamp is able to warm the lamp without disturbing the illumination.

In order to achieve the above object, an illuminating apparatus according to one aspect of the present invention includes a casing having an open side, a light reflective surface formed on the interior of the casing, a light diffusive transmission member on the casing and covering the open side, a discharge lamp mounted in the casing underneath the light diffusive transmission member, a first heating element disposed between the discharge lamp and light reflective surface, and a second heating element disposed between the discharge lamp and the light diffusive transmission member.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a cross-section showing a first embodiment of an illuminating apparatus according to the present invention;

FIG. 2 is an exploded perspective view showing the illuminating apparatus of FIG. 1;

FIG. 4 is a cross-section showing a second embodiment of an illuminating apparatus according to the present invention;

FIG. 5 is a partial perspective view of the low pressure mercury vapour discharge lamp of FIG. 4; and FIG. 6 is a partial perspective view of a modification of the second heater of FIG. 4.

DESCRIPTION OF THE PREFERRED EMBODIMENTS

Figure 3:
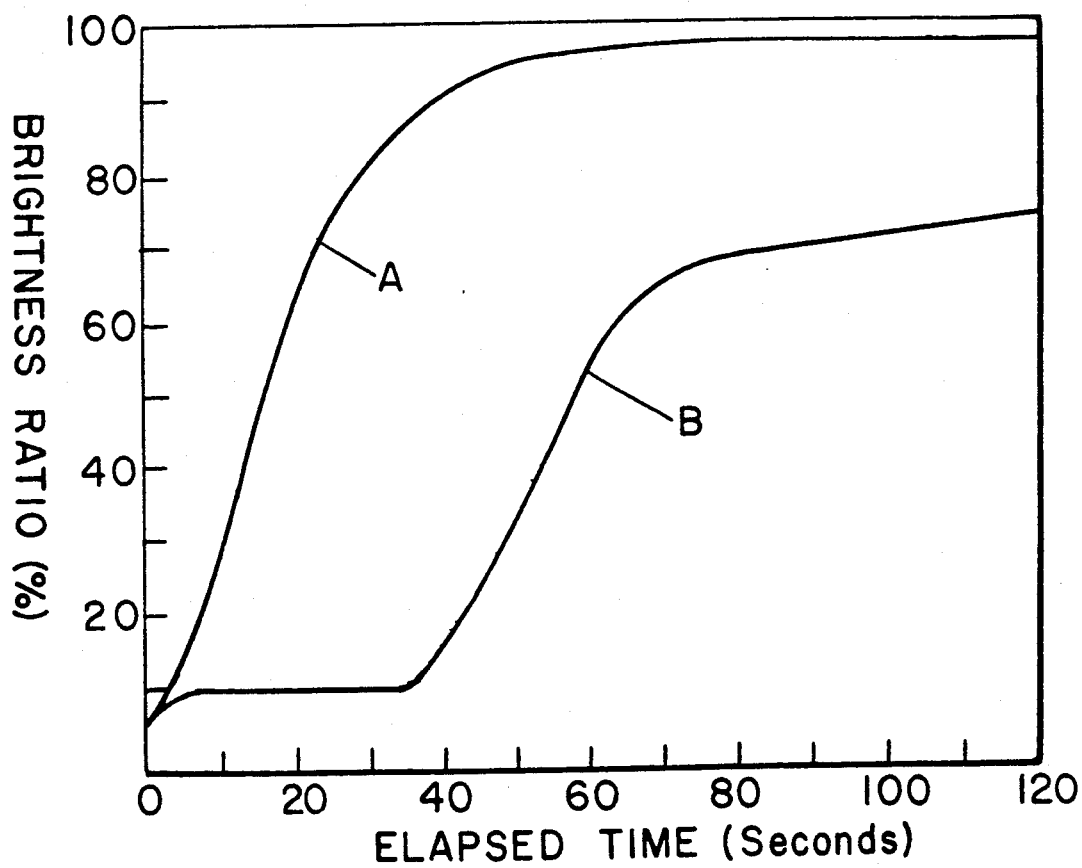
FIG. 3 is a graph showing the starting characteristics of the illuminating apparatus of FIG. 1 in comparison to a conventional illuminating apparatus.

The present invention will be described in detail with reference to the FIGS. 1 through 6. Throughout the drawings, like or equivalent reference numerals or letters will be used to designate like or equivalent elements for simplicity of explanation.

Referring now to FIGS. 1, 2 and 3, a first embodiment of the illuminating apparatus according to the present invention will be described in detail. In FIG. 1, a low pressure mercury vapor discharge lamp, e.g., a U-shaped fluorescent lamp 10 is housed in a casing 12. The casing 12 comprises a reflector 14 and a light diffusive transmission plate 16. The reflector 14 is composed of a synthetic resin such as polycarbonate. The cross-section of the reflector 14 is formed in a trough shape with a quadratic curve. A partition 18 with a triangular shape in cross-section is formed in the center of reflector 14. The whole inside surface of reflector 14 and partition 18 have light reflecting coating 20.

Referring now to FIG. 2, fluorescent lamp 10 comprises a bulb 22 formed into the U-shaped. That is, bulb 22 has a U-shaped center portion 24, a pair of elongated portions 26a and 26b which are parallel and extend from the ends of U-shaped center portion 24, and a pair of cathode electrodes 28a and 28b which are mounted inside the bulb 22 at the ends of elongated portions 26a and 26b. Cathode electrodes 28a and 28b have metal plates 30a and 30b and lead wires 32a and 32b, respectively. Metal plates 30a and 30b are formed into a V-shape. Lead wires 32a and 32b connect metal plates 30a and 30b to caps 34a and 34b which are fitted outside the ends of elongated portions 26a and 26b.

Referring back to FIG. 1, a phosphor coating 36 is coated on the inner surface of bulb 22. Also, a predetermined amount of mercury (Hg) and rare gas such as argon or xenon are sealed inside bulb 22. Mercury discharges between cathode electrodes 28a and 28b, i.e., metal plates 30a and 30b. Rare gas accelerates the start of the discharge.

Fluorescent lamp 10 is further provided with a pair of heaters 38a and 38b. Heaters 38a and 38b are coated on the outer surface of bulb 22. For example, heaters 38a and 38b are formed by printing resistive material, as described later. Heaters 38a and 38b are formed in an elongated manner along the shape of bulb 22. One heater, i.e., first heater 38a is coated on the side of bulb 22 which faces reflector 14. The other heater, i.e., second heater 38b is coated on the other side of bulb 22 which faces light diffusive transmission plate 16. First heater 38a has a continuous surface, while second heater 38b has a mesh surface for allowing the light emitted from fluorescent lamp 10 to transmit therethrough.

As a variant of the first embodiment, other heaters 38e and/or 38f, as shown by broken lines in FIG. 1, may be formed on light diffusive transmission plate 16 and reflector 14, in place of heaters 38a and/or 38b or together with them. Such heaters 38e, 38f can effectively compensate the heat absorption by light diffusive transmission plate 16 and reflector 14 which absorb the heat of bulb 22, when they are close to each other for reducing the size of the illuminating apparatus.

Elongated portions 26a and 26b are laid along both sides of partition 18 so that partition 18 divides the inside space of reflector 14 for each of elongated portions 26a and 26b.

Also, caps 34a and 34b are laid on cut-away portions 40a and 40b which are formed in a side wall 42 of reflector 14. Then, fluorescent lamp 10 is fixed to side wall 42 of reflector 14 by, for example, adhering caps 34a and 34b to cut-away portions 40a and 40b of side wall 42.

Light diffusive transmission plate 16 is fitted on the upper opening of reflector 14. Light diffusive transmission plate 16 is a milky white color resin such as an acrylic resin so that light diffusive transmission plate 16 transmits diffused light. A pair of thick portions 44a and 44b are formed on the inner surface of light diffusive transmission plate 16 at portions facing elongated portions 26a and 26b. Thick portions 44a and 44b may be formed on the outer surface of light diffusive transmission plate 16. Thick portions 44a and 44b gradually become thinner further from the radial axis of elongated portions 26a and 26b.

The operation of the first embodiment of the illuminating device according to the present invention will be described below.

When the illuminating apparatus is operated, both fluorescent lamp 10 and heaters 38a and 38b are turned ON. Thus, heaters 38a and 38b accelerate the evaporation of the mercury sealed in bulb 22. That is, the rated vapor pressure of the mecury for causing the discharge in the bulb 22 is quickly obtained by the heat applied by heaters 38a and 38b, even if the ambient temperature is relatively low. Thus, stable lighting of fluorescent lamp 10 is easily and quickly achieved.

As heaters 38a and 38b are coated on bulb 22 of fluorescent lamp 10 on the perpendicular sides of bulb 22, i.e., the lower side facing with reflector 14 and the upper side facing with light diffusive transmission plate 16, a high heating efficiency of heaters 38a and 38b to the fluorescent lamp 10 is obtained. This is because the heat applied to bulb 22 by heaters 38a and 38b can compensate for the heat radiated from the sides of bulb 22, as described before. Thus, bulb 22 is uniformly heated by heaters 38a and 38b coated on the perpendicular sides of bulb 22. Thus, a rapid temperature rise of bulb 22 is achieved.

The rapid temperature rise of bulb 22 accelerates the evaporation of the mercury sealed in bulb 22. Thus, the vapor pressure of the mercury quickly reaches the rated value and excites the discharge lighting of the fluorescent lamp 10. As a result, the rated brightness is rapidly achieved.

Second heater 38b coated on the upper side of bulb 22 facing the light diffusive transmission plate 16 is formed as a mesh pattern for allowing the light emitted from fluorescent lamp 10 to transmit therethrough. Thus, second heater 38b is able to heat bulb 22 without disturbing the light transmission from fluorescent lamp 10 to an object to be illuminated, e.g., a liquid crystal display device.

When fluorescent lamp 10 is turned ON, a part of the light emitted from fluorescent lamp 10 is directly applied to light diffusive transmission plate 16. Part of the light is also applied thereto by reflection from reflector 14. The whole light thus diffusively transmits through light diffusive transmission plate 16 and illuminates the object such as the liquid crystal display device.

As reflector 14 has a quadratic curve, the light applied to reflector 14 is efficiently reflected towards light diffusive transmission plate 16. Further, as partition 18 is placed between elongated portions 26a and 26b of bulb 22, partition 18 increases the light reflecting efficiency. Thus the light illumination of the illuminating apparatus is increased.

Furthermore, thick portions 44a and 44b are formed on light diffusive transmission plate 16, as described above. The light transmissivity of thick portions 44a and 44b gradually increases from their peripherals to their centers. Thus, the brightness of the light transmitted through light diffusive transmission plate 16 is unified. As a result, a change in the brightness over the whole surface of light diffusive transmission plate 16 is removed.

FIG. 3 shows the brightness to elapsed time characteristics obtained by tests carried out on a sample of the first embodiment of the illuminating apparatus (sample A) and a sample of the second-described conventional illuminating apparatus (sample B), as described before. That is, sample A was provided with heaters 38a and 38b on both sides of bulb 22 facing the reflector 14 and the light diffusive transmission plate 16. Sample B was provided a heater similar to heater 38b on one side of a bulb similar to bulb 22, and was also facing a reflector similar to reflector 14. Other characteristics of samples A and B were made equal. Tests were then carried out at an ambient temperature of −30° C. by applying the same rated current to each.

In FIG. 3, the vertical coordinate represents the brightness ratio in which the scale of 100% corresponds to the rated brightness at the ambient temperature of +25° C. The horizontal coordinate represents the time elapsed from the turn-ON instant. Graph A was plotted according to the test carried out on sample A, i.e., the sample of the first embodiment of the illuminating apparatus. Graph B was plotted according to the test carried out on sample B, i.e., the sample of the second conventional illuminating apparatus.

As can be seen from the diagram, even if the inputs to the heaters are identical and their total heat generating powers are identical, the illumination rising characteristics of the lamp in which the heaters are distributed, as in the first embodiemnt, is superior.

As shown in graph A, the brightness of sample A rose to almost 95% of the rated brightness at +25° C. after 40 seconds elapsed. Then, the brightness of sample A gradually rose to the 98% level. On the other hand, the brightness of sample B was depressed to 10% of the rated brightness until after about 35 seconds had elapsed. Then, the brightness of sample B began to rise. However, once the brightness of sample B had reached about 70% of the rated value, it rose very slowly thereafter. As shown in FIG. 3, it is easily understood that the illumination characteristics of the illuminating apparatus according to the present invention is remarkably improved.

In the first embodiment of the illuminating apparatus, second heater 38b coated on the upper side of bulb 22 is formed as a mesh pattern. The forming of the mesh can be achieved by a well-known printing technique. Thus, it does not require much labor.

The present invention is not limited to the embodiment described above. For example, FIGS. 4 and 5 show a second embodiment of the illuminating apparatus according to the present invention. The second embodiment of the illuminating apparatus is almost equivalent to the first embodiment, except for a second heater 38c coated on the upper side of bulb 22 facing the light diffusive transmission plate 16. Thus, the following explanation of the second embodiment will be focused on second heater 38c.

In FIG. 4, second heater 38c is also formed in a mesh similar to second heater 38b of the first embodiment. However, the central part of second heater 38c of the second embodiment is finely meshed. The mesh gradually becomes coarse towards the peripherals of second heater 38c.

For example, the top position of bulb 22 facing light diffusive transmission plate 16 by the shortest distance h1 would apply a light with the most intensive brightness to light diffusive transmission plate 16. The positions of bulb 22 corresponding to the peripheral portions of second heater 38c facing light diffusive transmission plate 16 from a distance h2 would apply light with relatively weak brightness to light diffusive transmission plate 16. However, in this embodiment, the central part of second heater 38c which corresponds to the top position of bulb 22 has the finest mesh. Thus, a relatively large amount of the light emitted from the top position of bulb 22 is depressed. On the other hand, the peripherals of second heater 38c have relatively rough meshes. Thus, a relatively large amount of the light emitted from the above-mentioned positions of bulb 22 transmit through second heater 38c. Thus, the second embodiment of the illuminating apparatus is able to unify the light illumination more than the first embodiment, and thus provide a more diffusive light.

In the second embodiment, thick portions 44a and 44b may be also formed on either the inner surface or the outer surface of light diffusive transmission plate 16.

Referring now to FIG. 6, a modification of the second heater will be briefly described. In this modification, second heater 38d is formed in a pattern with a plurality of parallel strips 46. The strips 46 are divided by slits 48. At the central part of second heater 38d, the strips 46 are finely arranged. The arangement of the strips 46 gradually becomes coarse towards the peripherals of second heater 38d.

In the present invention, the illuminating apparatus can be modified in many ways. For example, bulb 22 can take on a W-shape, a ring-shape, or a straight line shape. Low pressure mercury vapor discharge lamp 10 can comprise a rare gas discharge lamp, a cold cathode fluorescent lamp or a hot cathode fluorescent lamp. Electrodes 28a and 28b can be provided outside bulb 22. Furthermore, the application of the illuminating apparatus is not limited to the illumination of a liquid crystal display device.

As described above, the present invention can provide a preferable illuminating apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An illuminating apparatus comprising:
   a casing having an open side;
   a light reflective surface formed on an interior surface of the casing;
   a light diffusive transmission member covering the open side;
   a discharge lamp mounted in the casing underneath the light diffusive transmission member;
   a first heating element disposed between the discharge lamp and the light reflective surface; and
   a second heating element disposed between the discharge lamp and the transmission member the first and second heating elements being spaced so as to allow the discharge lamp to emit light therebetween.

2. An illuminating apparatus as in claim 1, wherein the first heating element is disposed on the discharge lamp.

3. An illuminating apparatus as in claim 1, wherein the first heating element is disposed on the light reflective surface.

4. An illuminating apparatus as in claim 1, wherein the second heating element is disposed on the discharge lamp.

5. An illuminating apparatus as in claim 1, wherein the second heating element is disposed on the light diffusive transmission member.

6. An illuminating apparatus as in claim 1, wherein the second heating element is formed as a mesh pattern.

7. An illuminating apparatus as in claim 6, wherein the second heating element is formed as a thin mesh pattern at points closest to the light diffusive transmission member and a thick mesh pattern at points furthest from the light diffusive transmission member.

8. An illuminating apparatus as in claim 6, wherein the second heating element is formed as a thin mesh pattern at points closest to the discharge lamp and a thick mesh pattern at points furthest from the discharge lamp.

9. An illuminating apparatus as in claim 1, wherein the second heating element is formed as a stripe pattern.

10. An illuminating apparatus as in claim 9, wherein the stripe pattern is thin at the points closes to the light diffusive transmission member and is thick at the points furthest from the light diffusive transmission member.

11. An illuminating apparatus as in claim 9, wherein the second heating element is formed as a thin stripe pattern at the points closest to the discharge lamp and a thick stripe pattern at the points farthest from the discharge lamp.

12. A method of providing illumination from a mercury vapor discharge lamp having a bulb filled with vapor, the discharge lamp being used with a light reflective surface on one side of an illuminating apparatus and a light diffusive transmission member on an opposite side of the illuminating apparatus, comprising the steps of:
    disposing a first heating element between the discharge lamp and the light reflective surface;
    disposing a second heating element between the discharge lamp and the transmission member the positions of the first and second heating elements being selected such that there is a space therebetween for light from the discharge lamp to pass therebetween;
    activating a power source; and
    providing power from the power source to the discharge lamp, first heating element, and second heating element, for achieving a rated vapor pressure of the mercury.

13. An illuminating apparatus as in claim 1, wherein the light diffusive transmission member has a wide portion facing the discharge lamp.

14. An illuminating apparatus as in claim 13, wherein the width of the wide portion decreases from a portion thereof directly opposite the center of the lamp towards the peripheries of the light diffusive transmission member.

15. A method as claimed in claim 12, wherein the step of disposing the second heating element between the discharge lamp and the light diffusive transmission member includes the step of disposing the second heating element on a surface of the light diffusive transmission member.

16. A method of providing illumination from a mercury vapor discharge lamp having a bulb filled with vapor, the discharge lamp being used with a light reflective surface on one side of an illuminating apparatus and a light diffusive transmission member on an opposite side of the illuminating apparatus, comprising the steps of:
    disposing a first heating element between the discharge lamp and the light reflective surface;
    disposing a second heating element on a surface of the light diffusive transmission member between the discharge lamp and the transmission member;
    activating a power source; and
    providing power from the power source to the discharge lamp, first heating element, and second heating element, for achieving a rated vapor pressure of the mercury.

17. An illuminating apparatus comprising:
    a casing having an open side;
    a light reflective surface formed on an interior surface of the casing;
    a light diffusive transmission member covering the open side;
    a discharge lamp mounted in the casing underneath the light diffusive transmission member;
    a first heating element disposed between the discharge lamp and the light reflective surface; and
    a second heating element disposed on the light diffusive transmission member, between the discharge lamp and the transmission member.

* * * * *